Oct. 1, 1940.         J. W. LEIGHTON         2,216,203
SHACKLE
Filed June 2, 1939
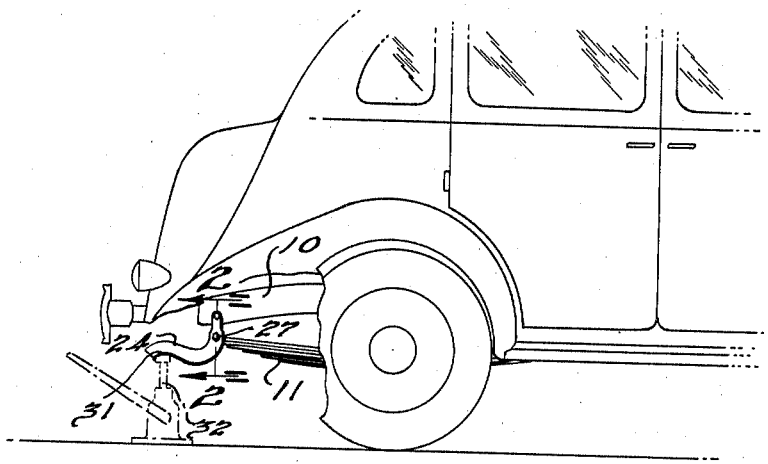
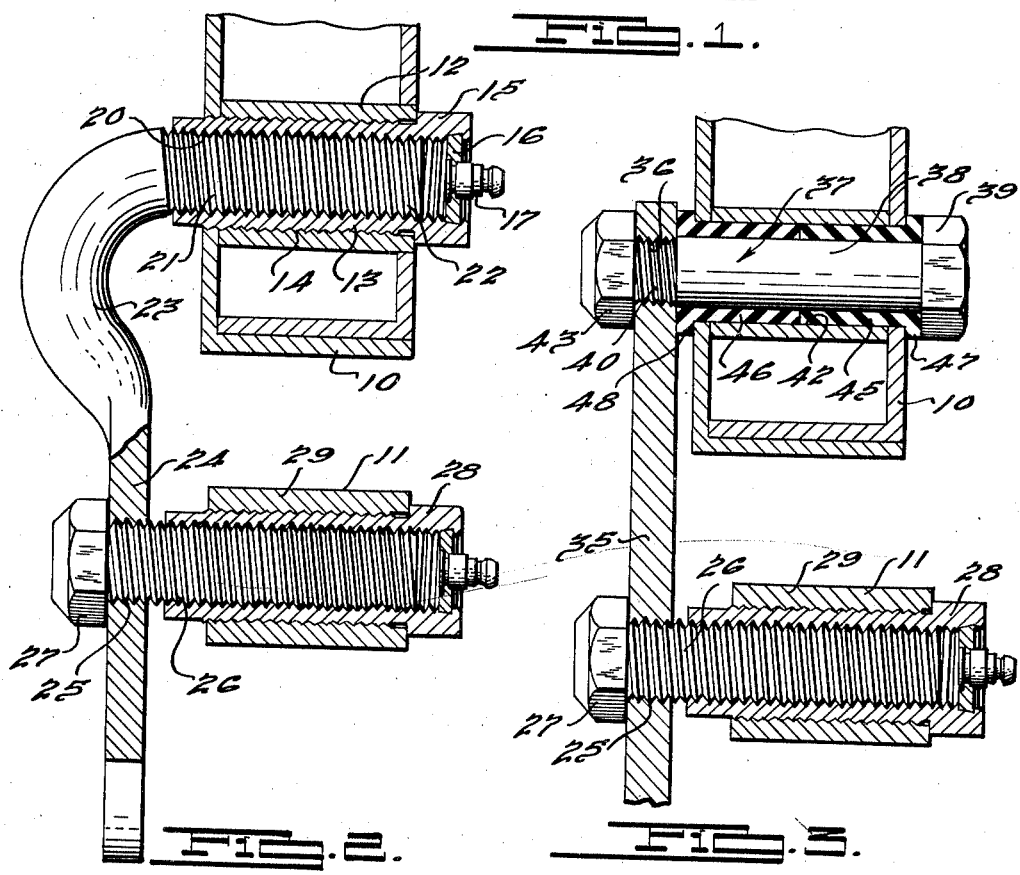
INVENTOR
John W. Leighton
BY
Harness, Dickey & Pierce
ATTORNEYS.

Patented Oct. 1, 1940

2,216,203

UNITED STATES PATENT OFFICE 2,216,203

SHACKLE

John W. Leighton, Port Huron, Mich.

Application June 2, 1939, Serial No. 277,097

1 Claim. (Cl. 267—54)

The invention relates generally to automobiles and it has particular relation to a shackle for connecting the spring to the vehicle frame.

One object of the invention is to provide an improved shackle which may be manufactured inexpensively and which may be assembled or connected with the vehicle frame and spring easily and efficiently.

Another object of the invention is to provide an improved shackle which includes an extension for engagement with a vehicle lifting jack.

Other objects of the invention will become apparent from the following specification, from the drawing to which it relates, and from the claim hereinafter set forth.

For a better understanding of the invention, reference may be had to the drawing, wherein:

Figure 1 is a fragmentary, elevational view, of a motor vehicle having a shackle constructed according to one form of the invention;

Fig. 2 is a cross-sectional view, taken on a larger scale, as seen substantially along line 2—2 of Fig. 1; and Fig. 3 is a view similar to Fig. 2, but illustrating another form of the invention.

Referring to Fig. 1, the frame of the vehicle is indicated at 10 and one of the springs is indicated at 11. It will be understood that one end of the spring is to be connected to the frame 10 by a shackle that has an oscillatory bearing connection with the frame and the spring.

Now directing attention particularly to Fig. 2, the frame is laterally apertured to receive a sleeve 12 and this sleeve may be fastened in place by welding. A bushing 13, having a shallow locking thread 14 on its external surface, is threaded into the sleeve 12, and the latter may have threads initially formed to match the external threads on the bushing or the internal threads in the sleeve may be formed by threading of the bushing thereinto. A hexagonal head 15 on one end of the bushing serves as a means for turning it and a central opening in the head is closed by a Welch plug 16 having a grease fitting 17.

The bushing has an internal thread 20 pivotally engaging an external thread 21 formed on a stem or shank 22 of a shackle arm or member 23. This shackle member is constructed from round bar stock and adjacent the stem 22 is curved in goose-neck fashion, so that the stem projects substantially at a right angle to the remainder of the bar. Beyond the goose-neck, the bar is flattened, so as to provide a thinner but wider portion 24, and this portion has a threaded opening 25. A threaded pin 26 having a head 27 is threaded through the opening until the head engages the outer side of the bar and four or five of the threads immediately adjacent the head 27 preferably are slightly greater in diameter than the outward threads so that when the pin is tightened, the threads will bind in the opening 25 and, in conjunction with the head 27, will thus positively lock the pin in place. The outward threaded portion of the pin is threaded into a bushing 28 that is like the bushing 13 and this bushing is threaded into a spring eye 29 on the longer leaf of the spring 11 and is held in place substantially in the same manner that the bushing 13 is held in the sleeve 12.

As seen in Fig. 2, the bar portion 24 is straight, but it will be observed, in conjunction with Fig. 1, that whle this bar portion is straight in one plane, it is curved and offset rearwardly in another plane and terminates in what may be called a concave end portion 31, the under side of which is adapted to be engaged by a reciprocatory jack element 32. When it is necessary to elevate the vehicle wheel, the jack is inserted under the end 31 in the manner shown by Fig. 1 and then operative actuation of the jack will elevate the bar and consequently the spring and wheel axle. Some oscillatory shifting of the shackle may occur during this elevation but the jack extension on the bar and the concave shape of the end 31 permit considerable oscillatory movement of the bar or shackle without endangering disengagement of the jack with the bar.

In the construction shown by Fig. 3, the shackle bar, indicated at 35, is flattened throughout instead of having the goose-neck portion and integral stem shown by Fig. 2, and the upper end of the flattened bar has a threaded opening 36 slightly smaller in diameter than the opening 25 provided for receiving the pin 26. A pin 37, having a main cylindrical portion 38, a head 39 on its outer end, and a threaded opposite end 40, projects through a sleeve 42 in the frame 10 and has its threaded end threaded through the opening 36. A nut 43 on the threaded end engages the outer side of the bar 35 and this nut engaging one side of the bar and the end of the cylindrical portion 38 engaging the other side, positively seats the pin or anchors it in position on the bar. The threaded end 40 also may have a tight fit in the opening 36, as explained in connection with the lower pin in Fig. 2, so as to still more positively anchor the pin in place.

Around the cylindrical portion 38 of the pin, separate cylindrical bushings 45 and 46, composed of resilient rubber, are provided, and these respectively have shoulders 47 and 48 that respectively project between the outer side of the frame and the head 39 and between the inner side of the frame and the bar 35. Initially, the rubber sleeves may be cylindrical throughout their length and the shoulders 47 and 48 may be automatically formed during assembling by axial compression of the rubber, or such shoulders may be preformed. The rubber completely fills the space between the metal sleeve and the cylindrical portion of the bolt and will cushion the shackle against shocks in all directions, and also will provide a certain degree of torsional resistance during oscillatory movement of the shackle.

Otherwise the bar 35 is like the bar shown by Fig. 2 and has a second pin connected thereto and to the spring eye in the manner previously described.

All of the parts, with the exception of the rubber bushings, can be constructed either of round or hexagonal steel bar stock, and in the case of the shackle bars, round bar stock is flattened and bent to provide the shape shown either in Fig. 2 or Fig. 3.

It is to be appreciated in general that the parts can be manufactured inexpensively and assembled easily and efficiently and that the jack extension on the shackle bar provides an abutment displaced longitudinally to a point where it is accessible.

Although more than one form of the invention has been illustrated and described in detail, it will be apparent to those skilled in the art that various modifications may be made without departing from the scope of the appended claim.

What is claimed is:

A shackle bolt comprising an elongated bar constructed of round bar stock and having one end offset laterally to provide an integral trunnion, and a second trunnion substantially parallel to and substantially spaced from the first trunnion and being connected to the bar, said bar at the point of connection of the second trunnion being substantially flattened and projecting linearly from said point in flattened condition to provide a substantially long, integral extension remote to the trunnions for engagement with a vehicle lifting jack.

JOHN W. LEIGHTON.